UNITED STATES PATENT OFFICE.

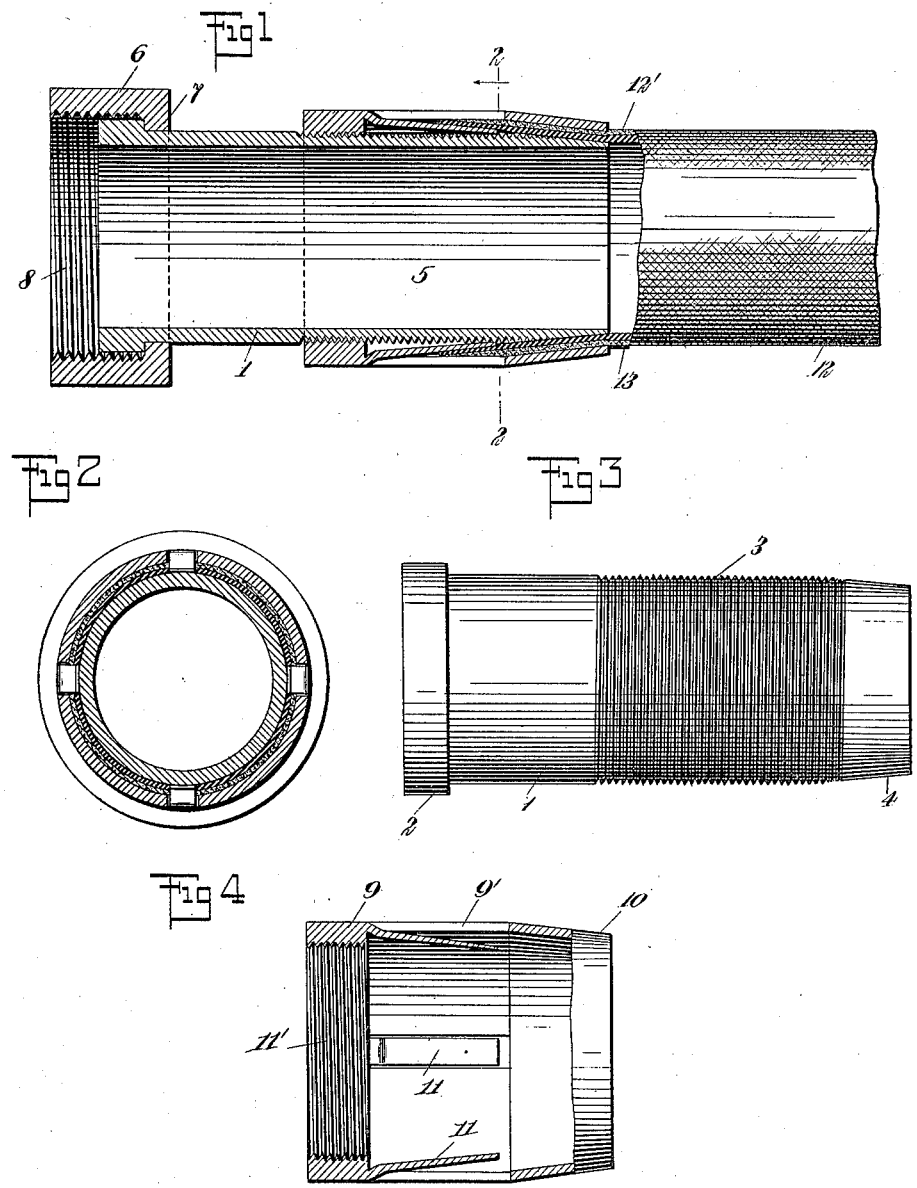

ORIN V. JACKSON, OF JACKSONVILLE, FLORIDA, ASSIGNOR TO ROMAIN B. McCULLOUGH AND ROLAND L. PHILIPS, BOTH OF BRUNSWICK, GEORGIA.

HOSE-LOCK.

1,030,184.   Specification of Letters Patent.   Patented June 18, 1912.

Application filed February 3, 1911. Serial No. 606,294.

*To all whom it may concern:*

Be it known that I, ORIN V. JACKSON, a citizen of the United States, and a resident of Jacksonville, in the county of Duval and State of Florida, have invented a new and Improved Hose-Lock, of which the following is a full, clear, and exact description.

My invention relates to hose locks designed to unite the end of a hose to a section of piping or nipple in such a way as to form a water-tight joint and permit the hose to be conveniently attached to the end of a water main or hydrant; and it comprises certain novel features of construction which will be more fully described in the accompanying specification and particularly pointed out in the claims appended thereto.

Reference is to be had to the accompanying drawings forming a part of this specification, in which the same characters of reference indicate the same parts in all the views.

Figure 1 is a longitudinal section, showing a construction of my improved hose lock with the end of a hose united thereto; Fig. 2 is a transverse section taken on the line 2—2 of Fig. 1; Fig. 3 is a side elevation of the nipple section of piping forming a part of my hose lock; and Fig. 4 is a longitudinal section of the clamping collar or sleeve which binds the end of the hose in place on the section of pipe or nipple.

My improved hose lock comprises a section of piping or nipple 1, having an external shoulder 2 at one end, and a conical surface 4 on its exterior at the other end. The outside surface of the nipple 4 is screwthreaded, as shown at 3, the screw-threads beginning at the base of the conical section 4 and continuing over as large a portion of the outer surface of the nipple as conditions require.

5 is a longitudinal bore through the nipple, this bore being cylindrical and being of uniform diameter throughout its length.

On one end of the nipple 1 is fitted a rotatable collar 6, this rotatable collar having an inwardly-extending flange or shoulder 7 at one end which coöperates with the external flange 2 on the nipple 1, and having internal screw-threads 8, by means of which the same can be screwed upon the end of a hydrant or water main to which the hose is to be attached.

For the purpose of connecting the hose to the nipple 1, I employ a clamping sleeve 9. This clamping sleeve has a cylindrical outside surface extending for the greater portion of the length thereof, and terminates at one end in a conical portion 10. Both the interior and exterior of this conical portion have conical surfaces, as shown particularly on Figs. 1 and 4. Around the circumference of the cylindrical portion 9', a series of spring fingers 11 are struck up in the manner shown on Fig. 4, these fingers extending from the base of the conical portion 10 nearly to the opposite end of the sleeve 9; and 11' are internal screw-threads formed on the sleeve 9 between the plane of the bases of the fingers 11 and the end of the sleeve. These screw-threads 11' engage the screw-threads 3 on the nipple 1, and when the sleeve 9 is turned it of course moves longitudinally on the nipple.

12 is a hose consisting of an outer covering of cloth or fiber and an inner tube 13 of rubber or other waterproof material. To unite the end of the hose 12 with the nipple 1, the clamping sleeve 9 is slipped over the end of the hose and forced along the outside of the same far enough to cause the spring fingers 11 to pass into the end of the hose and engage the inner tube 13. The spring fingers 11 normally occupy the position shown on Fig. 4, that is, their inner ends will project well within the interior of the sleeve 9. Consequently, when the sleeve 9 is slipped on the tube 12, the ends of the fingers 11 will pass inside the tube 12 and tend to spread the end of the tube. The result will be that as the sleeve 9 is forced along the tube 12, the outer surface of this tube will be forced by the spring fingers 11 to fit snugly against the interior conical surface of the end 10. When the sleeve 9 has been slipped over the end of the hose or tube 12 far enough, the spring fingers 11 will engage it tightly enough to hold the tube 12 and the sleeve 9 together.

The conical end 4 of the nipple 1 is now passed into the end of the sleeve 9 until the screw-threads 3 engage the screwthreads 11'. The nipple 1 is then screwed farther and farther into the sleeve 9 until the conical surface 4 on the inner end engages the inner surface of the inner tube 13 beyond the ends of the spring fingers 11. The conical surface 4 thus constricts the space between it and the interior conical surface of the end 10 of the sleeve 9. This binds the end of the hose 12 tightly between the nipple and sleeve, giving a water-tight fit and uniting the end of the hose 12 to the nipple 1 in the simplest and easiest manner. Obviously, by dispensing with the shoulder 2 on the nipple 1, and forming both ends with conical surfaces and screw-threads 3 and 4, I may use my lock to unite two sections of hose together. In such a case it will only be necessary to employ two clamping sleeves 9, and form conical surfaces and threads on both ends of the nipple 1.

I wish to reserve the right to make such changes in the shape and size of the parts as fairly come within the scope and spirit of my invention.

Having thus described my invention, I claim as new and desire to secure by Letters Patent:

1. A hose lock comprising a nipple, and a clamping sleeve mounted upon said nipple, said nipple being movable longitudinally with respect thereto, said nipple having an exterior conical surface and said sleeve having a corresponding interior surface, whereby the end of a hose can be tightly clamped between said sleeve and nipple, said sleeve also having spring fingers projecting inside the same and passing into the end of the hose when the sleeve is slipped on the same.

2. A hose lock comprising a nipple, and a clamping sleeve mounted upon said nipple, said nipple having an exterior conical surface and said sleeve having a corresponding interior surface, whereby the end of a hose may be held between the said sleeve and nipple, said sleeve also having spring fingers struck from its side walls and projecting inside the same to engage the end of the hose when the sleeve is slipped thereon, said sleeve and nipple having screw-threaded engagement, by means of which the conical surface of the nipple and the corresponding surface of the sleeve can be brought closer together in order to clamp the end of the hose between them.

3. A hose lock comprising a clamping sleeve adapted to be slipped over the end of a hose, said sleeve having fingers projecting inside the same in position to engage the end of the hose to spread the same when the clamping sleeve is slipped thereon, and a nipple passing into said sleeve and the end of the hose and gripping the same between the outer surface of the nipple and the inside surface of said sleeve.

4. A hose lock comprising a clamping sleeve adapted to be slipped over the end of a hose and having fingers projecting inside the same and passing inside the end of the hose to spread the same when the clamping sleeve is slipped thereon, and a nipple passing into said clamping sleeve and engaging the hose to grip the same between the outer surface of the nipple and the inside surface of said sleeve.

5. A hose lock comprising a clamping sleeve adapted to be slipped over the end of a hose, said sleeve having spring fingers struck from its sides and projecting inside the same in position to pass inside the end of the hose when the sleeve is slipped thereon, and a nipple passing into said sleeve and the end of the hose and gripping the hose securely between the outer surface of the nipple and the inside surface of said sleeve.

6. In a hose lock, a clamping sleeve adapted to be slipped over the end of a hose, said clamping sleeve having spring fingers projecting from its inside surface to pass inside the end of the hose when the clamping sleeve is slipped thereon, and means for locking said sleeve to said hose.

7. In a hose lock, a clamping sleeve adapted to be slipped over the end of a hose, said clamping sleeve having members projecting from its interior surface and extending therefrom toward the central axis of said clamping sleeve to pass inside the end of a hose when the clamping sleeve is slipped thereon, to spread the same, and means for locking the sleeve to the hose.

In testimony whereof I have signed my name to this specification in the presence of two subscribing witnesses.

ORIN V. JACKSON.

Witnesses:
WILLIAM F. NICKEL,
PHILIP D. ROLLHAUS.

Copies of this patent may be obtained for five cents each, by addressing the "Commissioner of Patents, Washington, D. C."